(12) United States Patent
Lotspiech

(10) Patent No.: US 6,609,116 B1
(45) Date of Patent: Aug. 19, 2003

(54) SYSTEM AND METHOD FOR SECURELY UPDATING COPY-PROTECTED MEDIA

(75) Inventor: Jeffrey Bruce Lotspiech, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/379,049

(22) Filed: Aug. 23, 1999

Related U.S. Application Data

(63) Continuation-in-part of application No. 09/065,938, filed on Apr. 24, 1998.

(51) Int. Cl.$^7$ .............................................. G06F 17/60
(52) U.S. Cl. ............................ 705/57; 705/50; 705/51; 705/54
(58) Field of Search ............................ 705/1, 50, 51, 705/54, 57

(56) References Cited

U.S. PATENT DOCUMENTS

| | | | | |
|---|---|---|---|---|
| 5,538,773 A | * | 7/1996 | Kondo | 428/64.1 |
| 5,592,552 A | | 1/1997 | Fiat | 380/21 |
| 5,666,411 A | * | 9/1997 | McCarty | 380/4 |
| 5,892,900 A | * | 4/1999 | Ginter et al. | 395/186 |
| 5,917,910 A | * | 6/1999 | Ishiguro et al. | 380/4 |
| 6,118,873 A | * | 9/2000 | Lotspiech et al. | 380/277 |

FOREIGN PATENT DOCUMENTS

JP        10177767 A  *  6/1998  ........... G11B/20/10

OTHER PUBLICATIONS

PArker, Dana J., "DVD copy protection: An agreement at last?", CD–ROM Professional, v9n12, p89–90, Dec. 1996.*

* cited by examiner

*Primary Examiner*—James P. Trammell
*Assistant Examiner*—Calvin L Hewitt, II
(74) *Attorney, Agent, or Firm*—John L. Rogitz

(57) ABSTRACT

A system and method for updating old blank media onto which newer content is sought to be copied, to reduce the risk of unauthorized copying of new content onto old unupdated media. A computer system executes a method in which one or more calculate media key commands (CMKC) are written onto a blank recording medium, with the CMKCs defining an old media key. One or more CMKCs defining a new media key is associated with broadcast content, with the new CMKCs effectively revoking one or more device keys of a suspected pirate device. A legitimate player/recorder can decrypt the media keys from both the medium and the content, and then encrypt the content using the new media key and encrypt the first unconditional CMKC in the new CMKCs with the old media key. The encrypted content and the (now conditional) CMKC are recorded on the medium.

16 Claims, 4 Drawing Sheets

SYSTEM

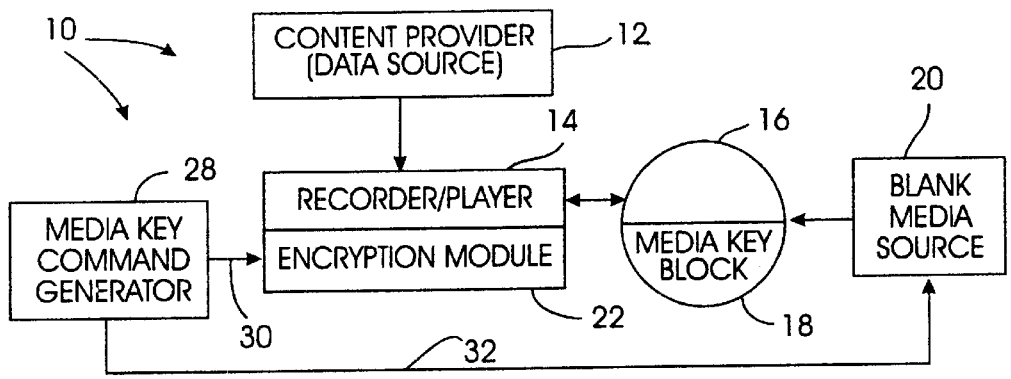
FIG. 1 - SYSTEM
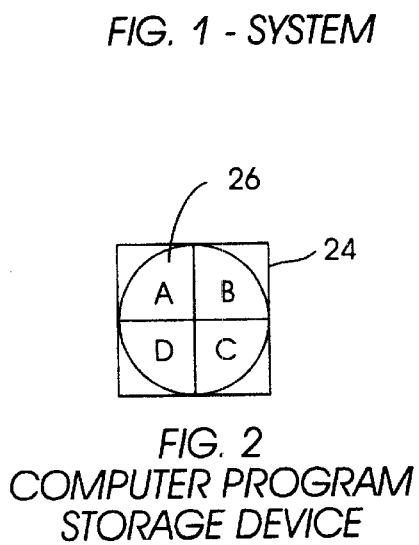
FIG. 2
COMPUTER PROGRAM
STORAGE DEVICE
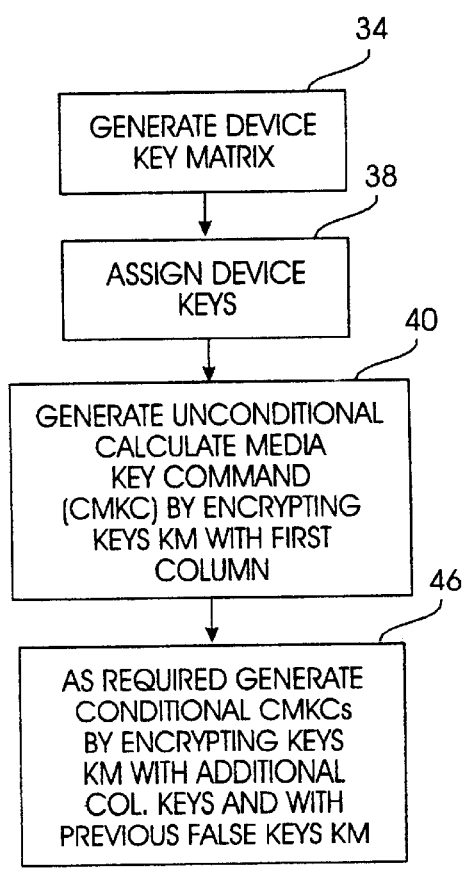
FIG. 3
LOGIC FLOW OF MEDIA KEY
COMMAND GENERATOR

| $S_{1,1}$ | $S_{1,2}$ | $S_{1,3}$ | $S_{1,4}$ | $S_{1,5}$ | $S_{1,6}$ | $S_{1,7}$ |
|---|---|---|---|---|---|---|
| $S_{2,1}$ | $S_{2,2}$ | $S_{2,3}$ | $S_{2,4}$ | $S_{2,5}$ | $S_{2,6}$ | $S_{2,7}$ |
| $S_{3,1}$ | $S_{3,2}$ | $S_{3,3}$ | $S_{3,4}$ | $S_{3,5}$ | $S_{3,6}$ | $S_{3,7}$ |
| $S_{4,1}$ | $S_{4,2}$ | $S_{4,3}$ | $S_{4,4}$ | $S_{4,5}$ | $S_{4,6}$ | $S_{4,7}$ |
| $S_{5,1}$ | $S_{5,2}$ | $S_{5,3}$ | $S_{5,4}$ | $S_{5,5}$ | $S_{5,6}$ | $S_{5,7}$ |
| $S_{6,1}$ | $S_{6,2}$ | $S_{6,3}$ | $S_{6,4}$ | $S_{6,5}$ | $S_{6,6}$ | $S_{6,7}$ |
| $S_{7,1}$ | $S_{7,2}$ | $S_{7,3}$ | $S_{7,4}$ | $S_{7,5}$ | $S_{7,6}$ | $S_{7,7}$ |
| $S_{8,1}$ | $S_{8,2}$ | $S_{8,3}$ | $S_{8,4}$ | $S_{8,5}$ | $S_{8,6}$ | $S_{8,7}$ |

*FIG. 4 - DEVICE KEY MATRIX* 36

| GEN. | $E_{(k_1,S_{1,4})}$ |
|---|---|
|  | $E_{(k_1,S_{2,4})}$ |
|  | $E_{(k_1,S_{3,4})}$ |
|  | $E_{(k_1,S_{4,4})}$ |
|  | $E_{(k_1,S_{5,4})}$ |
|  | $E_{(k_1,S_{6,4})}$ |
|  | $E_{(k_1,S_{7,4})}$ |
|  | $E_{(k_1,S_{8,4})}$ |

*FIG. 5*
*UNCONDITIONAL CALCULATE MEDIA KEY COMMAND (CMKC)*

| GEN. | $E_{(k_2,S_{1,4})}$ |
|---|---|
|  | $E_{(k_2,S_{2,4})}$ |
|  | $E_{(x,S_{3,4})}$ |
|  | $E_{(k_2,S_{4,4})}$ |
|  | $E_{(k_2,S_{5,4})}$ |
|  | $E_{(x,S_{6,4})}$ |
|  | $E_{(k_2,S_{7,4})}$ |
|  | $E_{(k_2,S_{8,4})}$ |

*FIG. 6*
*PROSPECTIVE CONDITIONAL CMKC, PRIOR TO ENCRYPTION*

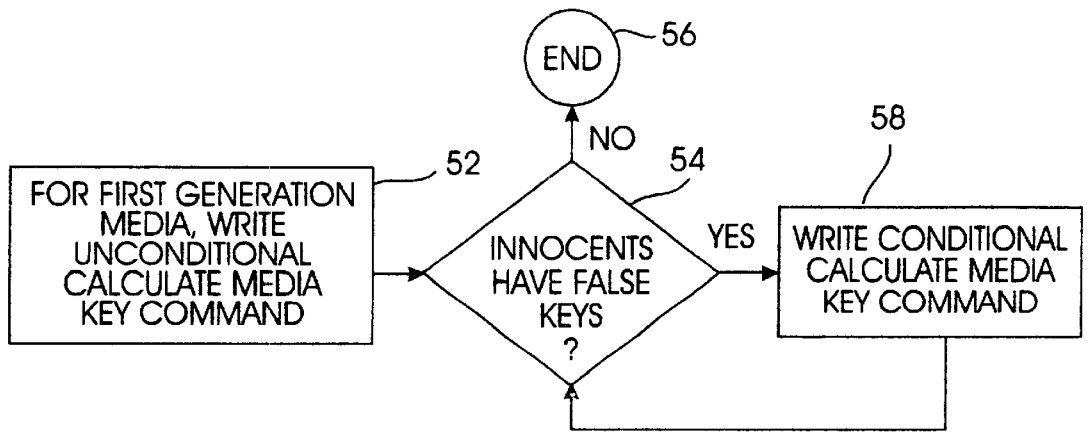
*FIG. 7 - OVERALL LOGIC FLOW*
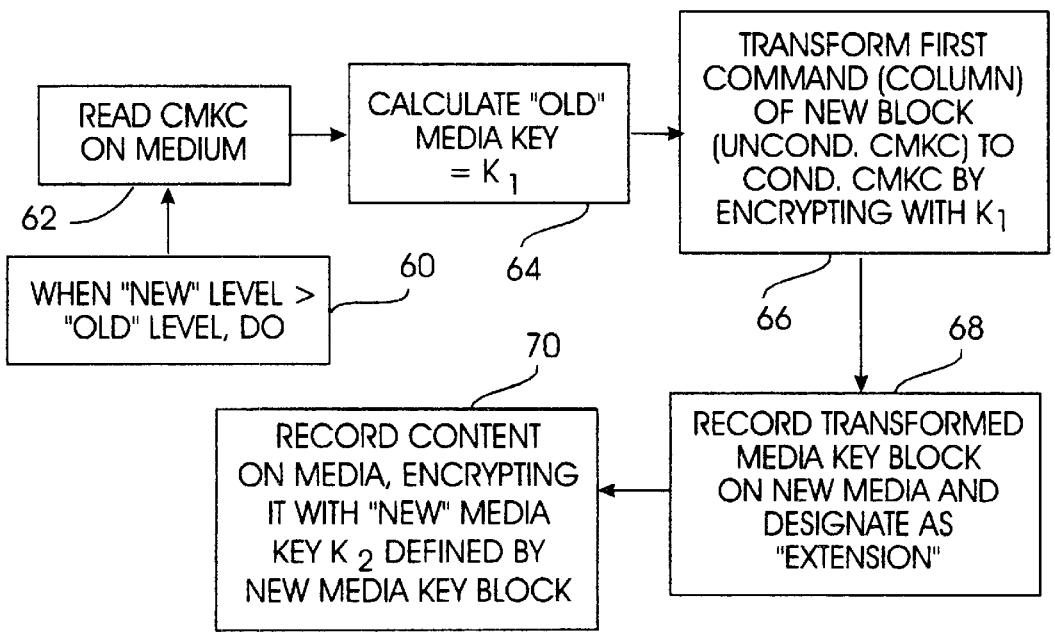
*FIG. 8
LOGIC FLOW FOR
ENCRYPTION MODULE "RECORD"*

LOGIC FLOW FOR
ENCRYPTION MODULE "PLAY"

SYSTEM AND METHOD FOR SECURELY UPDATING COPY-PROTECTED MEDIA

PRIORITY CLAIM

This application is a continuation-in-part of U.S. patent application Ser. No. 09/065,938, filed Apr. 24, 1998 for an invention entitled "System for Encrypting Broadcast Programs in the Presence of Compromised Receiver Devices" ("parent application").

BACKGROUND OF THE INVENTION

1. Field of the Invention

The present invention relates generally to broadcast data encryption, and more particularly to the encryption of recordable media to minimize unauthorized recording of content onto blank media.

2. Description of the Related Art

The advantages of digitized video and music are numerous, but one significant drawback is that being digitized, the content is relatively easy to copy perfectly, without authorization of the copyright owner. Copies can be made of digital audio and video content that is broadcast to in-home receivers over a network such as, for example, Home Box Office (HBO), or that is provided to in-home users on media such as digital video disks (DVDs). Indeed, widespread copying by pirates costs content owners billions of dollars per year. Thus, the present invention as well as the above-referenced parent application understand that it is desirable to limit the unauthorized copying of digital audio and video.

As recognized in related U.S. patent application Ser. No. 09/358,162, filed Jul. 20, 1999 (attorney docket no. AM9-99-026) and incorporated herein by reference ("related application"), the problem is complicated by the desire of governmental bodies and consumer protection lobbies to permit a buyer of digitized content to make a single copy for archive purposes or other legitimate reasons. Accordingly, the problem addressed in the related application is how to enable a user to copy a broadcast program, but once only, using the general broadcast key encryption scheme of the parent application.

In the above-referenced parent application, a matrix of encrypted shared secrets is transmitted to individual recorders, which have been programmed with individual device keys that are used to decrypt the shared secrets to render a media key. The media key is then used to encrypt/decrypt content, as appropriate. The present invention recognizes, however, that the entire matrix need not be provided in one transmission to all recorders, but rather the matrix can be transmitted in increments over time to legitimate recorders. As understood herein, this feature advantageously can account for the presence of compromised or pirate devices in accordance with the below disclosure, particularly when the compromised or pirate devices were not known at the time the original recorder or the blank media were manufactured.

SUMMARY OF THE INVENTION

A system is disclosed for encrypting one or more broadcast programs. The system includes user devices that include respective device keys selected from a set of device keys. A media key block generator writes an old media key block that defines an old media key onto at least one blank recording medium. Also, the media key block generator generates a new media key block that defines a new media key, and the new media key block is associated with a broadcast content and is transmitted to a user device. Essentially, the new media key block revokes at least some device keys of suspected pirate recorders. A decryption module that is accessible to each user device enables legitimate devices to decrypt one or more media key blocks by means of the device keys to render one or more of the respective media keys. With this invention, a user device that is able to decrypt the new media key encrypts the content with the new media key and transforms and records, onto a blank medium, the new media block using the old media key derived from the old media key block.

In a preferred embodiment, the old media key block is established at least in part by an unconditional calculate media key command (CMKC) and the new media key block is established at least in part by the unconditional CMKC and at least one conditional CMKC. Each CMKC includes at least one column (or other subset) of a matrix of media numbers encrypted by device keys, with a conditional CMKC being further encrypted by at least one media key, calculated from a previous CMKC. To revoke the device key of a suspected pirate device, a CMKC includes at least one dummy number encrypted with the device key of a suspected pirate device.

In another aspect, a computer and/or a computer program device has computer usable means that undertake a method including receiving at least an unconditional CMKC on a recording medium, with the unconditional CMKC having an associated old level. Also, the method includes accessing a set of device keys to derive an old media key from the old CMKC, and receiving at least one CMKC associated with a broadcast content. The new CMKC has an associated new level. It is then determined whether the new level is higher than the old level, and if so, the set of the device keys is accessed to derive a new media key from the new CMKC. Additionally, the method includes transforming the new unconditional CMKC to a conditional CMKC and recording the conditional CMKC onto the medium, and encrypting the content using the new media key and copying the content onto the medium.

In still another aspect, a computer-implemented method is disclosed for transmission of one or more broadcast programs. The method includes providing to plural user devices plural computer-usable device keys selected from a set of device keys. Also, the method includes writing at least an unconditional CMKC onto a blank recording medium, with the unconditional CMKC defining an old media key. Moreover, the method includes providing at least a first CMKC and associating the first CMKC with broadcast content, with the first CMKC defining a new media key. The media keys are decrypted, and the content then encrypted using the new media key to render encrypted content. Moreover, the first CMKC is encrypted using the old media key to render an encrypted unconditional CMKC associated with the broadcast content, with the encrypted content and encrypted conditional CMKC being recorded onto the recording medium.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present system;

FIG. 2 is a schematic diagram of a computer program product;

FIG. 3 is a flow chart of the acts for generating the unconditional calculate media key command (CMKC) and for generating prospective conditional CMKC;

FIG. 4 is a schematic diagram of a device key matrix;

FIG. 5 is a schematic diagram of an unconditional CMKC;

FIG. 6 is a schematic diagram of a conditional CMKC, i.e., before encryption to render an actual CMKC;

FIG. 7 is a flow chart of the overall logic;

FIG. 8 is a flow chart of the logic for encrypting content; and

DETAILED DESCRIPTION OF THE PREFERRED EMBODIMENTS

Figure 9:
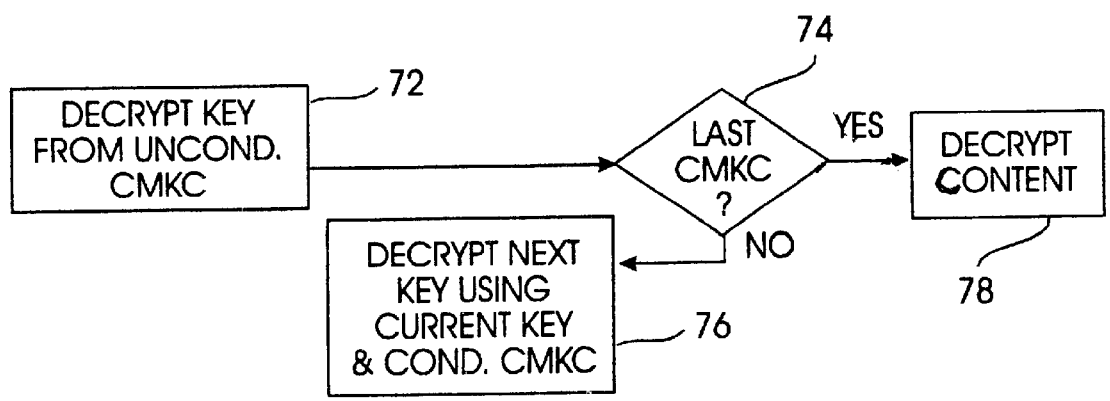
FIG. 9 is a flow chart of the logic for reading, i.e., playing, content.

Referring initially to FIG. 1, a system for broadcast encryption of content is shown, generally designated 10. By "broadcast" is meant the wide dissemination of a program from a content provider 12 to many users simultaneously over cable (from a satellite source), or wire, or radiofrequency (including from a satellite source), or from widely marketed content disks.

In the particularly preferred architecture shown, the system 10 includes plural player-recorders 14 (only one player-recorder 14 shown for clarity of disclosure) that are owned and operated by consumers. Each player-recorder 14 includes a player that can display data stored on a disk such as a compact disk or digital video disk, and a recorder that communicates with the player via a bus, such as an IEEE 1394 bus. Also, the player/recorder can communicate, via the bus, with a receiver (not shown) such as a cable set-top box that receives cable programming originally broadcast via satellite, or a satellite receiver for directly receiving such programming from a satellite. Further details of one preferred architecture are set forth in the above-referenced related application.

It is the purpose of the present invention to enable legitimate user player/recorders 14 to copy content that is received from either a receiver or from a disk onto a blank medium 16, while updating encryption data on the medium 16. The blank medium 16 includes a media key block 18, described more fully below, which is written to the blank medium 16 by a blank media source 20, e.g., a vendor of blank CDs or DVDs.

An encryption module 22 is accessible by the player/recorder 14, which is controlled by a digital processing apparatus. In one intended embodiment, the digital processing apparatus is included as a digital signal processor (DSP) or application specific integrated circuit (ASIC) chip or other digital processing circuitry in the player-recorder 14. Other digital processors, however, may be used, such as a personal computer or laptop computer made by International Business Machines Corporation (IBM) of Armonk, N.Y., or any other suitable processing apparatus. In any case, the processor of the player-recorder 14 accesses the encryption module 22 to undertake the logic shown and discussed below, which may be executed by a processor as a series of computer-executable instructions.

The instructions may be contained on a data storage device with a computer readable medium, such as a computer diskette 24 shown in FIG. 2 having a computer usable medium 26 with code elements A–D stored thereon. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C++ compatible code.

Indeed, the flow charts herein illustrate the structure of the modules of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function acts corresponding to those shown.

In addition to the above components, the system 10 includes a media key generator 28 that communicates with the encryption module 22 during manufacture of the player/recorder 14 to send to the player/recorder 14 a set of device keys in accordance with disclosure below. Also, the media key command generator 28 communicates with the player/recorder 14 via a communication path 30, such as the Internet, subsequent to manufacture, for purposes to be shortly set forth. Moreover, the media key command generator 28 communicates with the blank media source 20 via an online or off-line path 32 to send data to the blank media source 20 that is used for writing media key blocks 18 onto various generations of blank media 16.

In the above-referenced parent application, the present media key block is referred to as the "session key block". For a full understanding of the details of the preferred broadcast encryption scheme and how it can be used to defeat unauthorized copyists, reference is made to the above-referenced patent application. To summarize the preferred broadcast encryption logic set forth therein as modified by the present invention, however, reference is now made to FIG. 3.

In accordance with the present invention, at block 34 of FIG. 3 a device key matrix is generated. One exemplary device key matrix is shown in FIG. 4 and designated 36. Each device key $S_{j,i}$ is a random number of predetermined bit size, with the predetermined bit size of the presently preferred embodiment being sixty four (64). Per present principles, i= the integers from 1 to N inclusive and j= the integers from 1 to M inclusive. In accordance with present principles, "i" is a key index variable and "j" is a sets index variable.

At block 38, each user player-recorder 14 is assigned selected keys "S" from the matrix 36 by a licensing agency. For example, a first user player-recorder 14 might be assigned the keys $S_{3,1}$, $S_{5,2}$, $S_{1,3}$, $S_{1,4}$, $S_{6,5}$, $S_{4,6}$, and $S_{8,7}$. In any case, each user player-recorder 14 is assigned "N" device keys, and each player-recorder 14 is assigned one and only one device key "S" for each key index variable "i". Embodiments, however, wherein a device might not include a device key for each and every $i^{th}$ position are within the scope of the above-referenced invention. In any case, no single player-recorder 14 learns two keys at the same position in the key index dimension. Preferably, no player-recorder 14 has exactly the same device keys "S" as any other device, although the device keys of many devices might overlap. The device keys of a particular player-recorder 14 are accessible to the respective module 22, and the entire set of device keys used in the system 10 are accessible to a system encryption module for purposes to be shortly disclosed. A list of the respective subset of device keys that is given to each player-recorder 14 can be kept by a licensing agency.

Proceeding to block 40, an unconditional calculate media key command (CMKC) is generated. As can be appreciated in reference to FIG. 5, an unconditional CMKC 42 is generated by encrypting a plurality of randomly generated keys "km" of length "1", with each device key of an $i^{th}$ index variable. Each device key encrypts only a single random key from the group "k". Those device keys that are not compromised by pirate devices will encrypt the media key designated "k1", whereas compromised device keys encrypt other "false" keys. For example, in FIG. 6 the device keys $S_{3,4}$ and $S_{6,4}$ have been suspected as being compromised and accordingly have been used to encrypt the false key "x". Stated differently, the licensing agency accesses the subset of device keys that have been assigned to the compromised device, and then identifies at least one key position, e.g., the $i^{th}$ key position, of the compromised device in which the particular device key $S_{j,i}$ that has been assigned to the compromised device resides, to use that device key to encrypt the false key "x". In one preferred embodiment, the length "1" is fifty six (56) bits. If desired, the first column of the key matrix 36 can be used to encrypt the random keys "km", but any of the columns can be used. indeed, more than a single column can be used, if desired.

In the preferred embodiment the unconditional CMKC 42 includes a "generation" number 44 that can be a thirty two (32) bit number representing the "age" of the calculate media key command to which it is appended. For the first, i.e., unconditional CMKC 42, the level can be notionally represented as zero (0), with subsequent levels, described further below in relation to the cancellation of compromised device keys, being notionally represented as "1", "2", and so on. Note that many CMKCs can have the same level.

When compromised device keys are suspected, the process moves to block 46, wherein one or more conditional CMKC 48 (FIG. 6) having generation fields 50 are generated. Simply put, a conditional CMKC 48, which subsequently will be encrypted by player/recorders 14 as described below, is generated in the same way that the unconditional CMKC 42 is generated, except that random keys "km" are additionally encrypted with one false key from a previous CMKC command, and the device keys used to encrypt the random keys are selected from a previously unused column or columns of the device key matrix 36.

Now referring to FIG. 7, at block 52, for first generation media (i.e., at level "0"), the unconditional CMKC 42 (FIG. 5) is written to blank media 16 by the blank media source 20 (FIG. 1). It is to be understood that blank media are written with all CMKC that are active. Thus, for subsequent generations of blank media, i.e., blank media manufactured after conditional CMKC have been determined as described herein, the blank media will be written with the unconditional CMKC and all conditional CMKC that are active at the time of manufacture.

At decision diamond 54, it is determined whether any innocent devices have false keys as a result of previous CMKC commands. This can occur because, due to bad luck, the device keys the innocent devices had in previous column (s) were the same being used by compromised player/recorders and since "neutralized". The present invention recognizes that one of the player-recorders 14 can be obtained by a so-called "pirate", who could clone the device, along with its device keys, to render one or more pirate devices that undesirably could receive and decrypt the content and then record it for resale to legitimate device users. It is possible for the licensing agency to learn about such pirate devices; the challenge met by the invention used in the preferred embodiment is to send a broadcast message to legitimate player-recorders that the pirate player-recorders cannot read. If such a determination is not made at decision diamond 54, the logic ends at state 56. Otherwise, at block 58 a conditional CMKC 48 is written together with the previous CMKCs.

Also, as set forth above once it is determined that a new conditional CMKC 48 must be written, for subsequently produced blank media 16, the unconditional CMKC 42 and any conditional CMKC 48 are written to the blank media. One or more CMKC on a medium establishes an "old" media key block for the medium, with the old media key block being associated with a level. The CMKC written by the logic shown in FIG. 7 can be recorded on the blank media at manufacture time, or it can be sent along with new broadcast programs. In the latter case, the one or more CMKC that accompany a broadcast content establishes a "new" media key block for the content, with the "new" media key block being associated with a level.

When a user wants a player/recorder to record content onto a blank medium 16, the logic of FIG. 8 can be invoked by the associated encryption module 22. It is to be understood that each content is broadcast with the latest CMKC. Accordingly, at block 60 the player/recorder 14 compares the level of the new media key block with the level of the old media key block on the blank media sought to be used. When the old media key block is at least as current as the new (broadcast content) media key block, the player/recorder simply decrypts an "old" media key "$k_1$", which is common to both the content and the blank medium, and then uses the old media key to encrypt the content and record it on the blank medium 16.

On the other hand, when compromised player/recorders have been suspected between the time the medium 16 was produced and the content was produced (and, hence, when the level of the content is higher, i.e., more recent than the level of the medium 16), the logic moves from block 60 to block 62. At block 62, the medium's CMKC is read, and the player/recorder 14 uses the appropriate device key to decrypt the old media key "$k_1$" from the medium at block 64. It is to be understood that key authentication can be undertaken using a predetermined string, e.g., "DEADBEEF", as described in the parent application.

Moving from block 64 to block 66, the first command on the "new" media key block (i.e., the media key block that accompanies the content sought to be recorded) is the unconditional CMKC, and the unconditional CMKC is transformed by the player/recorder 14 to a conditional CMKC by encrypting it with the old key "$k_1$". Although pirate player/recorders may be capable of undertaking the step at block 66 as a consequence of cracking the old media key block and consequently knowing the old media key $k_1$, this avails them nought, because the content, being encrypted with the new media key $k_2$, will remain unavailable to them.

Proceeding to block 68, the transformed media key block is recorded on the medium and designated as a "media key block extension". Then, at block 70 the content is encrypted with the media key of the content's (new) media key block, which for disclosure purposes will be referred to as "$k_2$", and then recorded onto the medium. Additional "new" media key blocks can be subsequently transmitted with future content in accordance with the above principles to render it difficult for future pirate recorders to record content that can be played by legitimate player/recorders. Also, "new" media key blocks can be subsequently transmitted with future content to transmit new media keys to innocent player/recorders who might share a revoked key with pirate recorders, in accordance with principles set forth in the parent application.

FIG. 9 shows the logic for reading, i.e., playing, content on a medium that has been recorded in accordance with FIG. 8. Starting at block 72 in FIG. 9, a key k is decrypted from the unconditional CMKC by a player/recorder seeking to play the content. The logic moves to decision diamond 74 to determine whether the last CMKC has been processed, and if not, the logic proceeds to block 76, wherein the next CMKC is processed using the current key and the conditional CMKC. If the next CMKC is successfully decrypted, the resulting key becomes the current key. If the last CMKC has been processed, the logic moves from decision diamond 74 to block 78. Legitimate recorders, at the end of the process, will be left with the new media key $k_2$, and will then decrypt and play the content at block 78. Pirate devices whose device keys have been revoked by means of the new media key block, however, do not decrypt the new media key $k_2$.

Although a pirate recorder that has access to an old media key $k_1$ could write an old media key block extension or forego writing an extension altogether and thereby copy old content, such a device cannot copy new content (typically the most desirable content) in a way that legitimate player/recorders could read, assuming that the device keys of the pirate have been effectively revoked using the above principles.

As importantly, without the present invention a legitimate player/recorder would be able to make a copy of content onto old media, that would then be copyable by a pirate device. The present invention solves this problem because legitimate player/recorders bring old media up-to-date, whereas pirate devices whose device keys have been revoked as described herein cannot.

While the particular SYSTEM AND METHOD FOR SECURELY UPDATING COPY-PROTECTED MEDIA as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A system for encrypting one more broadcast programs, comprising:
   plural user devices, each device including plural computer-usable device keys selected from a set of device keys;
   a media key block generator writing an old media key block defining an old media key onto at least one recording medium and generating a new media key block defining a new media key and associated with broadcast content and transmitted to a user device; and
   a decryption module accessible to each user device for enabling at least some devices to decrypt one or more media key blocks by means of the device keys to render one or more of the respective media keys, whereby a user device able to decrypt the new media key encrypts the content with the new media key and records, onto a medium, a new media block using the old media key derived from the old media key block, wherein the old media key block is established at least in part by an unconditional calculate media key command (CMKC) and the new media key block is established at least in part by the unconditional CMKC and at least one conditional CMKC.

2. The system of claim 1, wherein each CMKC includes at least one subset of a matrix of media numbers encrypted by device keys.

3. The system of claim 2, wherein a conditional CMKC is further encrypted by at least one media key.

4. The system of claim 1, wherein a CMKC includes at least one dummy number encrypted with a device key of a suspected pirate device.

5. A computer including a data storage device including a computer usable medium having computer usable code means for encrypting digital programs, the computer usable code means having:
   computer readable code means for receiving at least an unconditional CMKC on a recording medium, the unconditional CMKC having an associated old level;
   computer readable code means for accessing a set of device keys to derive an old media key from the CMKC;
   computer readable code means for receiving at least one conditional CMKC associated with a broadcast content, the conditional CMKC having an associated new level;
   computer readable code means for determining whether the new level is higher than the old level, and if so, accessing the set of the device keys to derive a new media key from the conditional CMKC;
   computer readable code means for writing the conditional CMKC onto the medium; and
   computer readable code means for encrypting the content using the new media key and copying the content onto the medium.

6. The computer of claim 5, wherein the conditional CMKC written on the medium is rendered by encrypting an unconditional CMKC.

7. The computer of claim 6, wherein the conditional CMKC written on the medium is rendered by encrypting the unconditional CMKC using one of the media keys.

8. The computer of claim 7, wherein the conditional CMKC written on the medium is rendered by encrypting the unconditional CMKC using the old media key.

9. The computer of claim 5, wherein each CMKC includes at least one column of a matrix of media numbers encrypted by device keys.

10. The computer of claim 9, wherein a CMKC includes at least one dummy number encrypted with a device key of a suspected pirate device.

11. A computer-implemented method for transmission of one or more broadcast programs, comprising the acts of:
   providing to plural user devices plural computer-usable device keys selected from a set of device keys;
   writing at least an unconditional CMKC onto a blank recording medium, the CMKC defining an old media key;
   providing at least a new unconditional CMKC and associating the CMKC with broadcast content, the CMKC defining a new media key;
   decrypting the media keys;
   encrypting the content using the new media key to render encrypted content;

encrypting the new unconditional CMKC using the old media key to render encrypted conditional CMKC; and recording the encrypted content and newly encrypted unconditional CMKC onto the recording medium.

12. A computer program device, comprising:

a computer program storage device including a program of instructions usable by a computer to undertake method acts comprising:

receiving at least an unconditional CMKC on a recording medium, the unconditional CMKC having an associated old level;

accessing a set of device keys to derive an old media key from the old CMKC;

receiving at least one new unconditional CMKC associated with a broadcast content, the new unconditional CMKC having an associated new level;

determining whether the new level is higher than the old level, and if so, accessing the set of the device keys to derive a new media key from the new unconditional CMKC;

encrypting the new unconditional CMKC to make it a conditional CMKC;

writing the conditional CMKC onto the medium; and encrypting the content using the new media key and copying the content onto the medium.

13. The computer program device of claim 12, wherein the conditional CMKC recorded on the medium is rendered by encrypting the unconditional CMKC using one of the media keys.

14. The computer program device of claim 13, wherein the conditional CMKC recorded on the medium is rendered by encrypting the unconditional CMKC using the old media key.

15. The computer program device of claim 12, wherein each CMKC includes at least one column of a matrix of media numbers encrypted by device keys.

16. The computer program device of claim 15, wherein a CMKC includes at least one dummy number encrypted with a device key of a suspected pirate device.

* * * * *